(12) United States Patent
Joh et al.

(10) Patent No.: US 9,409,781 B2
(45) Date of Patent: Aug. 9, 2016

(54) LARGE-AREA CARBON NANOMESH FROM POLYMER AND METHOD OF PREPARING THE SAME

(71) Applicant: KOREA INSTITUTE OF SCIENCE AND TECHNOLOGY, Seoul (KR)

(72) Inventors: Han-Ik Joh, Seoul (KR); Su Young Son, Busan (KR); Sung Ho Lee, Gyeonggi-do (KR); Tae-Wook Kim, Gyeonggi-do (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 137 days.

(21) Appl. No.: 13/871,285

(22) Filed: Apr. 26, 2013

(65) Prior Publication Data

US 2014/0227162 A1    Aug. 14, 2014

(30) Foreign Application Priority Data

Feb. 12, 2013 (KR) .................. 10-2013-0014836

(51) Int. Cl.
*C01B 31/04* (2006.01)
*B32B 18/00* (2006.01)
(Continued)

(52) U.S. Cl.
CPC ............. *C01B 31/0446* (2013.01); *B01J 23/40* (2013.01); *B01J 23/70* (2013.01); *B01J 35/0013* (2013.01);
(Continued)

(58) Field of Classification Search
CPC  C01B 31/0446; C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32
USPC ......................................................... 423/448
See application file for complete search history.

(56) References Cited

U.S. PATENT DOCUMENTS 5,352,524 A    10/1994  Nagata
6,309,532 B1 *  10/2001  Tran et al. ............... 205/687
(Continued)

FOREIGN PATENT DOCUMENTS

JP    2009-203127 A    10/2009
JP    2012-250881 A    12/2012
(Continued)

OTHER PUBLICATIONS

Jingwei Bai, et al; "Graphene nanomesh", Nature Nanotechnology, vol. 5, pp. 190-194, Published online: Feb. 14, 2010.
(Continued)

*Primary Examiner* — Daniel C McCracken
(74) *Attorney, Agent, or Firm* — Ladas & Parry LLP

(57) ABSTRACT

The present disclosure relates to a polymer-based large-area carbon nanomesh and a method for preparing same. More particularly, the present disclosure provides a method for preparing a carbon nanomesh, including: preparing a polymer nanofilm by coating a solution of a block copolymer or a polymer mixture thereof on a substrate; stabilizing the polymer nanofilm by annealing such that the polymer nanofilm is phase-separated, a pore-forming polymer is removed and, at the same time, a nanomesh-forming polymer forms a stabilized porous polymer nanomesh; and carbonizing the stabilized porous polymer nanomesh by annealing at high temperature to prepare a carbon nanomesh. Using phase separation and cyclization of a polymer, a large-area carbon nanomesh with superior activity can be prepared simply with high reproducibility in large scale.

20 Claims, 9 Drawing Sheets

(51) Int. Cl.

| | |
|---|---|
| *C04B 35/524* | (2006.01) |
| *C04B 35/622* | (2006.01) |
| *C04B 38/00* | (2006.01) |
| *B01J 37/02* | (2006.01) |
| *B01J 23/40* | (2006.01) |
| *B01J 23/70* | (2006.01) |
| *B01J 35/00* | (2006.01) |
| *B01J 35/06* | (2006.01) |
| *C04B 111/00* | (2006.01) |

(52) U.S. Cl.
CPC ............... *B01J 35/06* (2013.01); *B01J 35/065* (2013.01); *B01J 37/0215* (2013.01); *B01J 37/0232* (2013.01); *B32B 18/00* (2013.01); *C04B 35/524* (2013.01); *C04B 35/62222* (2013.01); *C04B 38/0032* (2013.01); *C01B 2204/04* (2013.01); *C01B 2204/32* (2013.01); *C04B 2111/00844* (2013.01); *C04B 2237/363* (2013.01)

(56) References Cited

U.S. PATENT DOCUMENTS

| | | | |
|---|---|---|---|
| 6,372,192 B1* | 4/2002 | Paulauskas et al. | 423/447.7 |
| 8,597,738 B2 | 12/2013 | Yu et al. | |
| 8,697,230 B2 | 4/2014 | Ago et al. | |
| 8,884,310 B2 | 11/2014 | Seacrist et al. | |
| 2007/0013094 A1 | 1/2007 | Bischofsberger et al. | |
| 2008/0014426 A1 | 1/2008 | Nishikawa et al. | |
| 2010/0112322 A1 | 5/2010 | Kumar et al. | |
| 2010/0187482 A1 | 7/2010 | Mullen et al. | |
| 2012/0234695 A1* | 9/2012 | Mayes et al. | 205/758 |

FOREIGN PATENT DOCUMENTS

| | | | |
|---|---|---|---|
| KR | 1020060015252 A | 2/2006 | |
| KR | 1020090026568 A | 3/2009 | |
| KR | 1020090043418 A | 5/2009 | |
| KR | 1020090065206 A | 6/2009 | |
| KR | 101063359 B1 | 9/2011 | |
| KR | 1020100120492 A | 9/2011 | |
| KR | 101092378 B1 | 12/2011 | |
| KR | 10-1121557 B1 | 2/2012 | |
| KR | 1020120010142 A | 2/2012 | |

OTHER PUBLICATIONS

Zhengzong Sun, et al; "Growth of graphene from solid carbon sources", Nature, vol. 468, pp. 549-552, Nov. 25, 2010.

S. Adhirkari, et al; "Enhanced conductivity in iodine doped polyaniline thin film formed by thermal evaporation", Thin Solid Films, vol. 518, pp. 5421-5425, Available online Mar. 27, 2010.

Sun-Jung Byun, et al; "Graphenes Converted from Polymers", The Journal of Physical Chemistry Letters, vol. 2, pp. 493-497, Published Feb. 18, 2011.

Mubarak A. Khan, et al; "Effect of Alkali and Ultraviolet (UV) Radiation Pretreatment on Physical and Mechanical Properties of 1,6-Hexanediol Diacrylate-Grafted Jute Yarn by UV Radiation", Journal of Applied Polymer Science, vol. 92, 18-24, Jan. 27, 2004.

A.N. Obraztsov, et al; "Chemical vapor deposition of thin graphite films of nanometer thickness", Carbon 45, pp. 2017-2021; Available online Jun. 24, 2007.

M.S.A. Rahaman, et al; "A review of heat treatment on polyacrylonitrile fiber", Polymer Degradation and Stability 92, pp. 1421-1432; Available online Apr. 14, 2007.

USPTO RR dated Apr. 30, 2015 in connection with U.S. Appl. No. 13/292,326.

USPTO NFOA dated Sep. 25, 2015 in connection with U.S. Appl. No. 13/292,326.

USPTO NFOA dated Oct. 23, 2014 in connection with U.S. Appl. No. 13/771,788.

USPTO FOA dated Feb. 20, 2015 in connection with U.S. Appl. No. 13/771,788.

USPTO NFOA dated Aug. 14, 2015 in connection with U.S. Appl. No. 13/771,788.

\* cited by examiner

LARGE-AREA CARBON NANOMESH FROM POLYMER AND METHOD OF PREPARING THE SAME

CROSS-REFERENCE TO RELATED APPLICATION

This application claims priority to Korean Patent Application No. 10-2013-0014836, filed on Feb. 12, 2013, and all the benefits accruing therefrom under 35 U.S.C. §119, the contents of which in its entirety are herein incorporated by reference.

BACKGROUND

1. Field

The present disclosure relates to a polymer-based large-area carbon nanomesh and a method for preparing same. More particularly, it relates to a polymer-based large-area carbon nanomesh prepared using phase separation and cyclization of a polymer via a simple process with high reproducibility, thus being producible in large scale, and a method for preparing same.

2. Description of the Related Art

Graphene is a substance composed of carbon, with atoms arranged in a hexagonal pattern with a planar (2-dimensional) structure, exhibiting properties different from those of graphite or carbon nanotube having a 1-dimensional structure or fullerene having a 0-dimensional structure. It is reported that a single-layer graphene film has unique characteristics distinguished from those of other carbon materials, with a surface area of about 2600 $m^2/g$ and an electron mobility of 15,000-200,000 $cm^2/Vs$. In particular, electrons move on the graphene film with a speed close to that of light, because they flow on the graphene film as if they were massless.

The graphene film is mainly prepared by the Scotch tape method, epitaxial growth on silicon carbide, chemical method using a reducing agent or chemical vapor deposition.

The Scotch tape method physically exfoliates a graphene film from graphite using an adhesive tape. Although graphene with a good crystal structure can be obtained easily, the graphene in this way is about tens of micrometers in size and thus is limited in application to electronic devices or electrodes.

The epitaxial method separates carbon from the inside of silicon carbide crystals to the surface at high temperature to form a honeycomb structure peculiar to graphene. This method allows production of graphene films with uniform crystallinity, but electrical properties are relatively inferior to those obtained by other methods. Further, the silicon carbide wafer is very expensive.

The chemical method using a reducing agent involves oxidization of graphite, pulverization of the oxidized graphite to form oxidized graphene and reduction of the oxidized graphene using a reducing agent such as hydrazine. Although this method is advantageous in that the process is simple and carried out at low temperature, the oxidized graphene may not be completely reduced chemically, leading to defects on graphene and consequently poor electrical properties.

Lastly, the chemical vapor deposition deposits a carbon-containing gas at high temperature on a metallic catalyst film on which graphene can grow to obtain graphene films. Although this method allows high-quality large-area graphene films, the procedure of recovering the metallic catalyst film is complicated and difficult.

The graphene prepared in this way is applicable to various fields, from semiconductor devices to flexible electronic devices. However, since graphene is a semi-metal with a zero band gap, its application for a gate for current control in a field-effect transistor (FET) is limited.

In general, there are two methods of controlling the band gap of graphene.

The first method is to cut a single-walled carbon nanotube to obtain a graphene nanoribbon with a width not greater than 10 nm. Although this method provides semiconductor properties by opening of the band gap of graphene, it is inapplicable to commercialization of graphene.

The second method is to prepare a graphene nanomesh using a shadow mask. The method for preparing a graphene or carbon nanomesh involves the following six steps. 1) Graphene is physically exfoliated form graphite and transferred onto a substrate. 2) Under an etching condition, silicon oxide is deposited on the graphene to a thickness of tens of nanometers for selective removal of the graphene and coating of a shadow mask. 3) A block copolymer serving as a shadow mask is coated on the silicon oxide layer and a porous polymer film is prepared through annealing. 4) The silicon oxide layer is selectively removed by injecting reactive ions to result in a pattern similar to that of the porous polymer film. 5) A graphene nanomesh having a pattern similar to that of the resulting silicon oxide layer is prepared by removing exposed graphene using oxygen plasma. In this step, the porous polymer nanofilm is removed by the oxygen plasma treatment. 6) The prepared sample is immersed in hydrofluoric acid to remove the porous silicon oxide layer. Thus prepared graphene nanomesh has a controlled geometry with an inter-pore distance of not greater than 10 nm, thus exhibiting a controlled band gap and semiconductor properties. However, this method realizes the graphene nanomesh on a small piece of graphene and requires a complicated process involving the six steps, as described above. In addition, the reactive ion and oxygen plasma processes are expensive since they require high-vacuum conditions.

REFERENCES OF THE RELATED ART

Patent Documents (Patent document 1) Korean Patent Application Publication No. 10-2009-0026568
(Patent document 2) Korean Patent Application Publication No. 10-2010-0120492

Non-Patent Documents (Non-patent document 1) *Nature*, Z. Sun et al., 2010 (468), 549-552
(Non-patent document 2) *Nature Nanotechnology*, J. Bai et al., 2010, 5, 190-194

SUMMARY

The present disclosure is directed to providing a carbon nanomesh prepared using phase separation and cyclization of a block copolymer or a polymer mixture thereof. Specifically, polymer phase separation and thermal stabilization of a polymer nanofilm are induced without silicon oxide deposition or high-vacuum etching and a carbon nanomesh having a zero band gap is grown through carbonization.

In one aspect, there is provided a method for preparing a carbon nanomesh, including: preparing a polymer nanofilm by coating a solution of a block copolymer or a polymer mixture thereof on a substrate; stabilizing the polymer nanofilm by annealing such that the polymer nanofilm is phase-separated, a pore-forming polymer is removed and, at the same time, a nanomesh-forming polymer forms a stabilized porous polymer nanomesh; and carbonizing the stabilized porous polymer nanomesh by annealing at high temperature to prepare a carbon nanomesh.

In an exemplary embodiment, a metal nanofilm may be deposited on the polymer nanofilm before or after the stabilization.

In an exemplary embodiment, during the carbonization, the carbon nanomesh may be graphitized at 1800-3000° C. under an atmosphere of inert gas, hydrogen gas, vacuum or a combination thereof.

In an exemplary embodiment, the block copolymer or the polymer mixture thereof may be a block copolymer of one or more polymer or monomer selected from a group consisting of polyacrylonitrile, polyolefin, polyvinyl, cellulose, lignin, natural polymer and pitch or a mixture thereof.

In an exemplary embodiment, the polymer mixture may contain the pore-forming polymer and the nanomesh-forming polymer with a mixing ratio of 0.01-100 and a pore size and an inter-pore distance of the carbon nanomesh may be controlled by controlling the mixing ratio.

In an exemplary embodiment, the pore-forming polymer may have a molecular weight of 100-10,000,000.

In an exemplary embodiment, the nanomesh-forming polymer may have a molecular weight of molecular weight 100-10,000,000.

In an exemplary embodiment, the substrate may include one or more transition metal selected from a group consisting of platinum (Pt), ruthenium (Ru), copper (Cu), iron (Fe), nickel (Ni), cobalt (Co), lead (Pd), tungsten (W), iridium (Ir), rhodium (Rh), strontium (Sr), cesium (Ce), praseodymium (Pr), neodymium (Nd), samarium (Sm) and rhenium (Re) or an alloy thereof or may include one or more non-transition metal selected from a group consisting of magnesium (Mg), boron (B) and aluminum (Al) or an alloy thereof.

In an exemplary embodiment, in the preparation of the polymer nanofilm, the coating may be performed by one or more coating method selected from a group consisting of spin coating, dip coating, bar coating, self-assembly, spraying, inkjet printing, gravure printing, gravure offset printing, flexography and screen printing.

In an exemplary embodiment, in the stabilization, the polymer nanofilm may be formed into the nanomesh by annealing the polymer nanofilm at 400° C. or lower under an atmosphere of air, oxygen or vacuum.

In an exemplary embodiment, in the stabilization, the polymer nanofilm may be formed into the nanomesh by using a strongly alkaline aqueous solution, a strongly alkaline organic solution or a solvent with which only the pore-forming polymer reacts.

In an exemplary embodiment, in the stabilization, the polymer nanofilm may be formed into the nanomesh by applying plasma, ion beam, radioactive ray, ultraviolet light or microwave.

In an exemplary embodiment, in the stabilization, the polymer nanofilm may be formed into the nanomesh by using a comonomer.

In an exemplary embodiment, a metal of the deposited metal nanofilm may include one or more transition metal selected from a group consisting of platinum (Pt), ruthenium (Ru), copper (Cu), iron (Fe), nickel (Ni), cobalt (Co), lead (Pd), tungsten (W), iridium (Ir), rhodium (Rh), strontium (Sr), cesium (Ce), praseodymium (Pr), neodymium (Nd), samarium (Sm) and rhenium (Re) or an alloy thereof or may include one or more non-transition metal selected from a group consisting of magnesium (Mg), boron (B) and aluminum (Al) or an alloy thereof.

In an exemplary embodiment, the metal nanofilm may be deposited on the polymer nanofilm by thermal deposition, physical vapor deposition or chemical vapor deposition.

In an exemplary embodiment, the metal nanofilm may be deposited on the polymer nanofilm by coating one or more metal precursor material selected from a group consisting of a metal chloride comprising $CuCl_2$, $CoCl_2$, $OsCl_3$, $CrCl_3$, $(NH_3)_6RuCl_3$, $FeCl_3$, $NiCl_2$, $PdCl_2$, $RuCl_3$ and $H_2PtCl_6$, a metal nitride including $Pd(NO_3)_2$, $(NH_3)_4Pt(NO_3)_2$, $Fe(NO_3)_3$ and $Ni(NO_3)_2$, iron acetylacetonate, ferrocene and $Pt(acac)_2$ and then annealing.

In an exemplary embodiment, the carbonization may be performed by carbonizing the stabilized polymer nanomesh at 400-1800° C. under an atmosphere of inert gas, hydrogen gas, vacuum or a combination thereof.

In an exemplary embodiment, the carbonization may be performed in the presence of a doping gas and the doping gas may contain a group 3-7 element.

In an exemplary embodiment, in the carbonization, volatile carbon molecules may be injected and the volatile carbon molecules may be acetylene, ethylene or methane.

In an exemplary embodiment, the prepared carbon nanomesh may be 1-300 layers and may have a length of 1 nm to 1 m in horizontal and vertical directions, respectively.

In an exemplary embodiment, the prepared carbon nanomesh may have an inter-pore distance of 1 nm to 1 μm.

In another aspect, there is provided a nanomesh prepared by the above-described method.

In an exemplary embodiment, the carbon nanomesh may be a graphene nanomesh.

In another aspect, there is provided a carbon laminate containing the carbon nanomesh.

In accordance with the present disclosure, a large-area carbon nanomesh can be prepared through a simple process without silicon compound deposition or high-vacuum etching and, thus, production cost can be reduced remarkably.

Further, in accordance with the present disclosure, pore size, inter-pore distance, thickness, etc. of the prepared carbon nanomesh can be easily controlled to suit applications and a large-area carbon nanomesh with superior activity can be produced in large scale.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
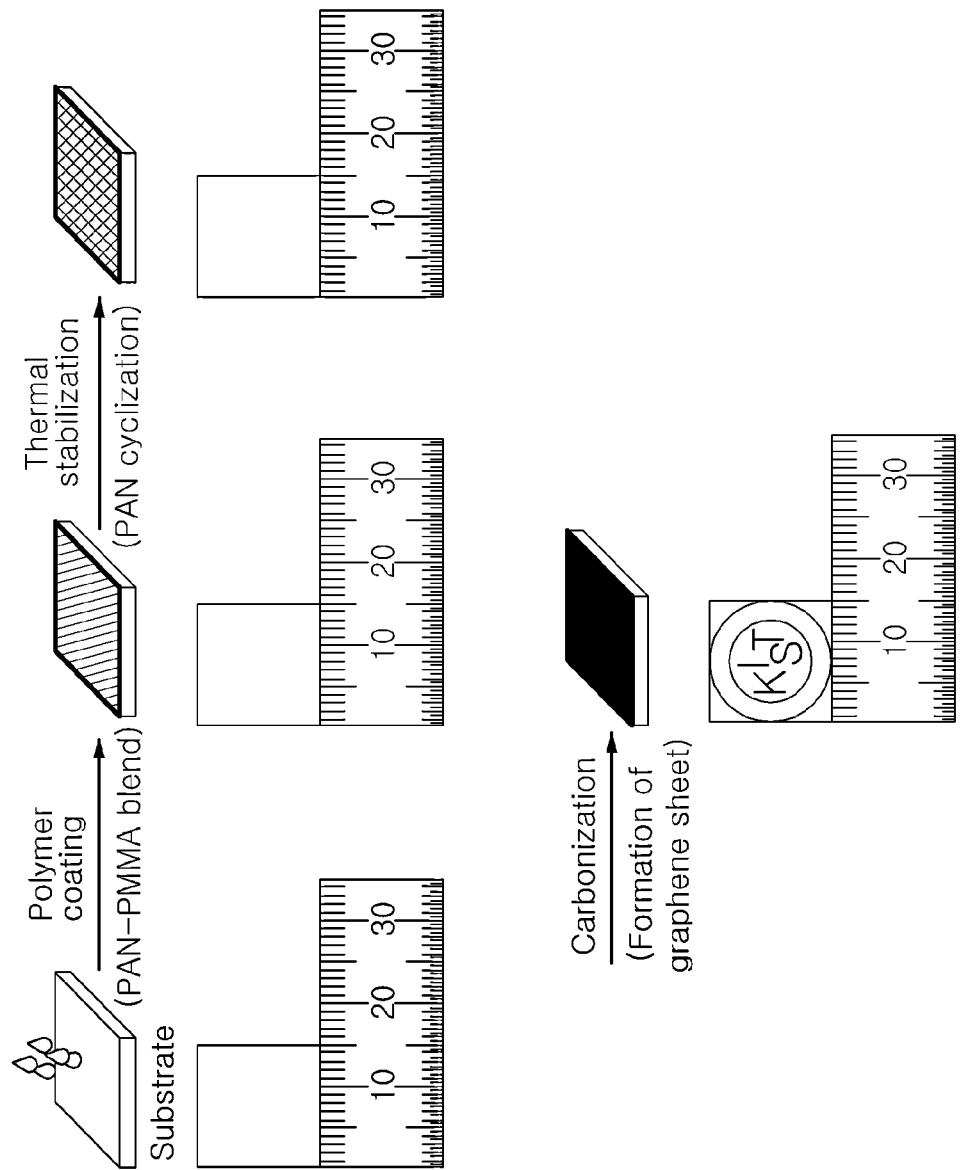
FIG. 1 shows a preparation process of Example 1 according to an exemplary embodiment of the present disclosure and images obtained at different steps.

Hereinafter, the present disclosure is described in detail.

As used herein, the term "pore-forming polymer" refers to a polymer which is removed during stabilization to form pores and the term "nanomesh-forming polymer" refers to a polymer which forms a carbon nanomesh during stabilization by annealing at high temperature.

In accordance with the present disclosure, a large-area carbon nanomesh can be prepared through a three-step process including polymer nanofilm preparation, stabilization and carbonization. When compared with the existing art, the processes of silicon compound deposition or high-vacuum etching can be omitted and, thus, production cost can be saved. Accordingly, a large-area carbon nanomesh with superior activity can be produced in large scale.

In an exemplary embodiment of the present disclosure, a method for preparing a carbon nanomesh according to the present disclosure includes: preparing a polymer nanofilm by coating a solution of a block copolymer or a polymer mixture thereof on a substrate; stabilizing the polymer nanofilm by annealing such that the polymer nanofilm is phase-separated, a pore-forming polymer is removed and, at the same time, a nanomesh-forming polymer forms a stabilized porous polymer nanomesh; and carbonizing the stabilized porous polymer nanomesh by annealing at high temperature to prepare a carbon nanomesh.

In another exemplary embodiment of the present disclosure, a metal nanofilm may be deposited on the polymer nanofilm before or after the stabilization.

In another exemplary embodiment of the present disclosure, during the carbonization, the carbon nanomesh may be graphitized at 1800-3000° C. under an atmosphere of inert gas, hydrogen gas, vacuum or a combination thereof.

First, in the preparation of the polymer nanofilm, a polymer nanofilm is prepared by coating a solution of a block copolymer or a polymer mixture thereof on a substrate.

The block copolymer or the polymer mixture thereof may be a block copolymer of one or more polymer or monomer selected from a group consisting of polyacrylonitrile, polyolefin, polyvinyl, cellulose, lignin, natural polymer and pitch or a mixture thereof.

Before, after or during the stabilization, the block copolymer or the polymer mixture thereof is thermally annealed or solvent annealed in a temperature range that can affect one polymer, thereby increasing mobility of the polymer and inducing aggregation of like polymers (hereinafter, phase separation of polymer).

In particular, a pore size and an inter-pore distance of the carbon nanomesh may be controlled by controlling a mixing ratio of the polymer mixture. Specifically, the polymer mixture may contain the pore-forming polymer and the nanomesh-forming polymer with a mixing ratio (pore-forming polymer/nanomesh-forming polymer) of 0.01-100, more specifically 0.1-10. A polymer nanofilm prepared from a polymer mixture solution containing a relatively small amount of the pore-forming polymer and a relatively large amount of the nanomesh-forming polymer is phase-separated before, after or during the stabilization and, at the same time, the pore-forming polymer is removed.

The polymer that forms pores (i.e., the pore-forming polymer) should be decomposed at a relatively lower temperature or be more easily removed by a solvent as compared to the polymer that forms the nanomesh (i.e., the nanomesh-forming polymer). Accordingly, the pore-forming polymer needs to be relatively more easily removable. In an exemplary embodiment, the block copolymer or the polymer mixture thereof may contain PMMA as the pore-forming polymer and PAN as the nanomesh-forming polymer.

The pore-forming polymer and the nanomesh-forming polymer may have a molecular weight of 100-10,000,000, more specifically, 10,000-1,000,000, respectively. It is because the phase separation pattern (e.g., lamella, gyroid, hexagonally packed cylinder, body-centered cubic, etc.) of the block copolymer or the polymer mixture thereof becomes different in general depending on the kind of polymers, temperature, molecular weight, film thickness, or the like and there are hundreds or more combinations of polymers that can induce the phase separation of the polymer mixture.

Specifically, the substrate on which the polymer is coated may be one or more of a silicon substrate, a silicon compound substrate such as silicon oxide, quartz, silicon nitride, silicon carbide, etc., a metal oxide substrate such as $Al_2O_3$, ZnO, etc., a group 3-5 compound semiconductor substrate such as GaN, GaAs, etc., although not being particularly limited thereto. For example, the substrate may include one or more transition metal selected from a group consisting of platinum (Pt), ruthenium (Ru), copper (Cu), iron (Fe), nickel (Ni), cobalt (Co), lead (Pd), tungsten (W), iridium (Ir), rhodium (Rh), strontium (Sr), cesium (Ce), praseodymium (Pr), neodymium (Nd), samarium (Sm) and rhenium (Re) or an alloy thereof or may include one or more non-transition metal selected from a group consisting of magnesium (Mg), boron (B) and aluminum (Al) or an alloy thereof.

The polymer solution is coated on the substrate. A coating method is not particularly limited but, specifically, may be one or more selected from a group consisting of spin coating, dip coating, bar coating, self-assembly, spraying, inkjet printing, gravure printing, gravure offset printing, flexography and screen printing.

A thickness of the polymer nanofilm prepared by coating the polymer solution is not particularly limited but may be in the order of tens of nanometers.

Next, in the stabilization, the prepared polymer nanofilm is annealed such that the polymer nanofilm is phase-separated, the pore-forming polymer that is decomposed at low temperature is removed and, at the same time, the nanomesh-forming polymer forms a stabilized porous polymer nanomesh.

In the stabilization, the prepared polymer nanofilm may be formed into the nanomesh by annealing the polymer nanofilm at 400° C. or lower under an atmosphere of air, oxygen or vacuum. As a result of the annealing, the polymer nanofilm is phase-separated, the pore-forming polymer is removed and, at the same time, the nanomesh-forming polymer forms the polymer nanomesh structure. In particular, a polymer having a functional group with carbon and nitrogen atoms triply bonded (e.g., PAN, pitch, PIM, etc.) is cyclized at 400° C. or lower to result in a hexagonal structure.

In addition to the annealing, the polymer nanofilm may also be formed into the nanomesh by using a strongly alkaline aqueous solution, a strongly alkaline organic solution or a solvent with which only the pore-forming polymer reacts.

Also, the polymer nanofilm may be formed into the nanomesh by applying plasma, ion beam, radioactive ray, ultraviolet light or microwave. In an exemplary embodiment of the present disclosure, when the polymer nanofilm is treated with plasma in the presence of oxygen ions, phase separation and stabilization are achieved similarly to the annealing. In particular, they occur at relatively lower temperature in the presence of oxygen and at around 400° C. under an inert gas atmosphere.

In addition, the polymer nanofilm may also be formed into the nanomesh by modifying the polymer chain structure or chemically crosslinking the polymer chain using a comonomer. In particular, such an effect can be maximized when itaconic acid is bound to the polymer.

A metal nanofilm may be deposited on the polymer nanofilm before or after the stabilization to induce the formation of the nanomesh and improve the properties of the finally prepared carbon nanomesh.

The metal nanofilm formed on the polymer nanofilm surface through the deposition may improve crystallinity and structure of the carbon nanomesh, particularly graphene nanomesh, and, at the same time, reduce the inter-pore distance.

A metal of the deposited metal nanofilm may include one or more transition metal selected from a group consisting of platinum (Pt), ruthenium (Ru), copper (Cu), iron (Fe), nickel (Ni), cobalt (Co), lead (Pd), tungsten (W), iridium (Ir), rhodium (Rh), strontium (Sr), cesium (Ce), praseodymium (Pr), neodymium (Nd), samarium (Sm) and rhenium (Re) or an alloy thereof or may include one or more non-transition metal selected from a group consisting of magnesium (Mg), boron (B) and aluminum (Al) or an alloy thereof.

The metal nanofilm may be deposited on the polymer nanofilm by thermal deposition, physical vapor deposition or chemical vapor deposition.

Also, the metal nanofilm may be formed by coating a metal precursor and then annealing without additional treatment. The metal precursor may be one or more selected from a group consisting of a metal chloride including $CuCl_2$, $CoCl_2$, $OsCl_3$, $CrCl_3$, $(NH_3)_6RuCl_3$, $FeCl_3$, $NiCl_2$, $PdCl_2$, $RuCl_3$ and $H_2PtCl_6$, a metal nitride including $Pd(NO_3)_2$, $(NH_3)_4Pt(NO_3)_2$, $Fe(NO_3)_3$ and $Ni(NO_3)_2$, iron acetlyacetonate, ferrocene and $Pt(acac)_2$.

The coating of the metal precursor may be performed by one or more coating method selected from a group consisting of spin coating, dip coating, bar coating, self-assembly, spraying, inkjet printing, gravure printing, gravure offset printing, flexography and screen printing.

Then, the stabilized polymer nanomesh is carbonized by annealing at high temperature to prepare the carbon nanomesh.

In the carbonization, the polymer nanomesh is carbonized at 400-1800° C. under an atmosphere of inert gas, hydrogen gas, vacuum or a combination thereof. The carbonization may be performed while injecting a doping gas such as ammonia so as to dope dopant atoms into the carbon nanomesh surface to suit the application of the carbon nanomesh.

The doping gas may contain a group 3-7 element. Also, in order to obtain a high-quality carbon nanomesh, volatile carbon molecules may be injected together. The volatile carbon molecules may be acetylene, ethylene or methane.

During the carbonization, the carbon nanomesh may be graphitized at 1800-3000° C. under an atmosphere of inert gas, hydrogen gas, vacuum or a combination thereof in order to prepare a high-quality carbon nanomesh.

The graphitization is performed to allow the carbon atoms to form perfectly hexagonal rings. At the carbonization temperature (1800° C. or lower), a small quantity of heteroatoms may be included in the carbon nanomesh, resulting in decreased structural perfection of the carbon structure. If the annealing temperature is increased further, a structurally more perfect carbon material (in particular, graphene) can be prepared.

The prepared carbon nanomesh may be 1-300 layers and may have a length of 1 nm to 1 m in horizontal and vertical directions, respectively.

And, the prepared carbon nanomesh may have an inter-pore distance of 1 nm to 1 μm.

A graphene nanomesh as one of the carbon nanomesh prepared according to an exemplary embodiment of the present disclosure may have a hexagonal ring structure composed of carbon atoms, which may be 0-, 1- or 2-dimensional.

A carbon laminate containing the prepared graphene nanomesh or carbon nanomesh may be used for electronic devices such as transparent electrode, organic light-emitting diode (OLED), organic photovoltaic cell (OPVC), etc.

EXAMPLES

Hereinafter, a graphene nanomesh and a carbon nanomesh prepared using phase separation and cyclization of a block copolymer or a polymer mixture thereof according to the present disclosure will be described in detail through examples. However, the following examples are for illustrative purposes only and it will be apparent to those of ordinary skill in the art that the scope of the present disclosure is not limited by the examples.

As shown in FIG. 1, graphene and carbon nanomeshes according to the present disclosure are prepared by first dissolving polyacrylonitrile (PAN) and poly(methyl methacrylate) (PMMA) are dissolved in a polar organic solvent dimethylformamide (DMF) for about 1 hour using a stirrer. The resulting mixture is coated on a quartz substrate using a spin coater. To induce the coated polymer to be formed into a nanomesh, annealing is performed at 270° C. for 2 hours under an air atmosphere. The nanomesh is carbonized in a carbonization furnace under a controlled gas atmosphere.

Example 1

In order to investigate the effect of the mixing ratio of the polymer mixture on the properties of the prepared graphene and carbon nanomeshes, a polymer solution containing a nanomesh-forming polymer and a pore-forming polymer with a mixing ratio of 6:4, 5:5 or 4:6 was prepared.

The polymer solution was coated on a 1.5 cm×1.5 cm quartz substrate using a spin coater. The coated polymer nanofilm was carbonized under an argon/hydrogen gas mixture atmosphere by heating to 1200° C. at a rate of 5° C./min to prepare graphene and carbon nanomeshes.

Figure 2:
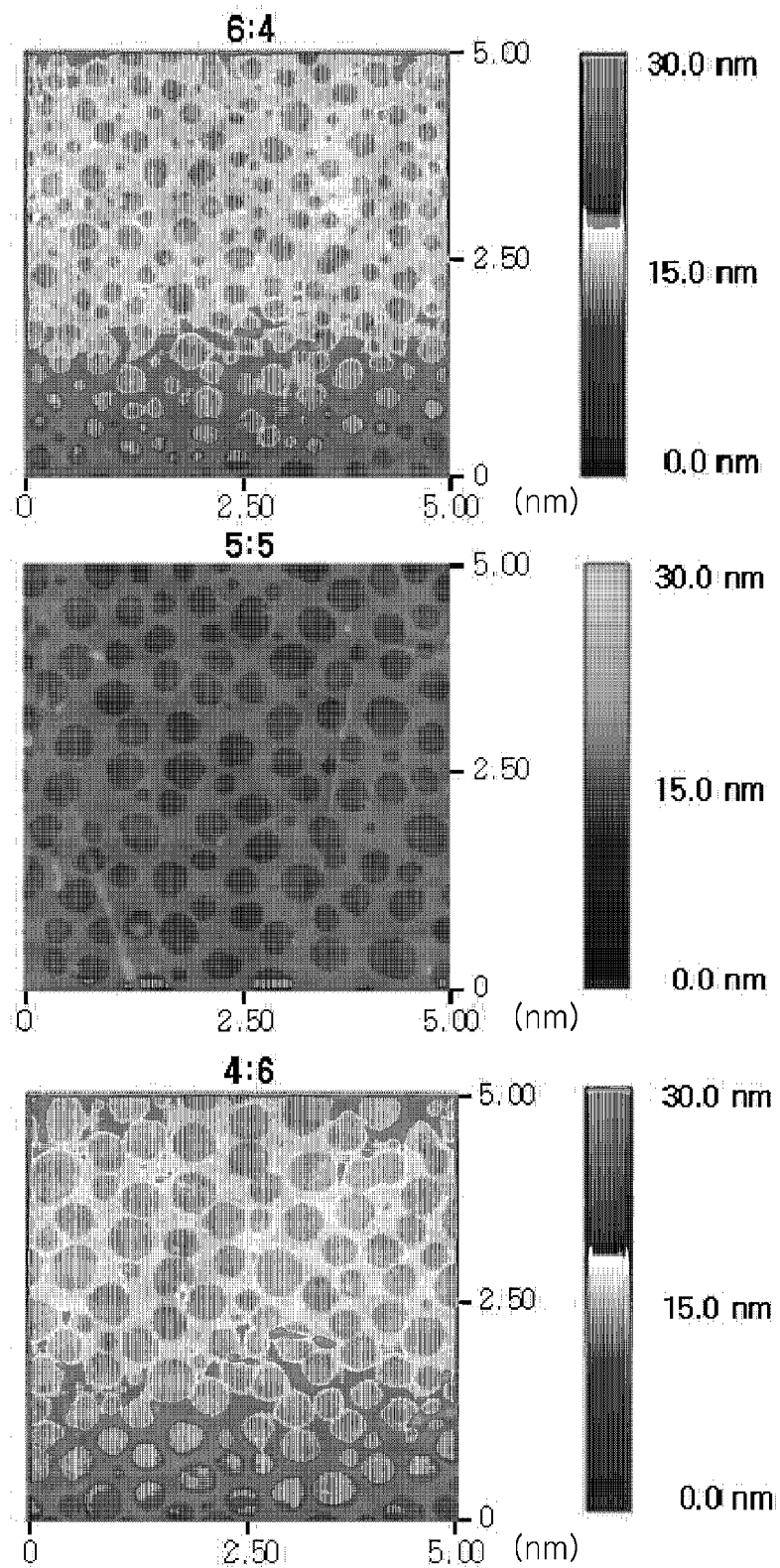
FIG. 2 shows atomic force microscopic (AFM) images of graphene nanomeshes prepared in Example 1 according to an exemplary embodiment of the present disclosure with varying mixing ratios of a polymer mixture.
Figure 3:
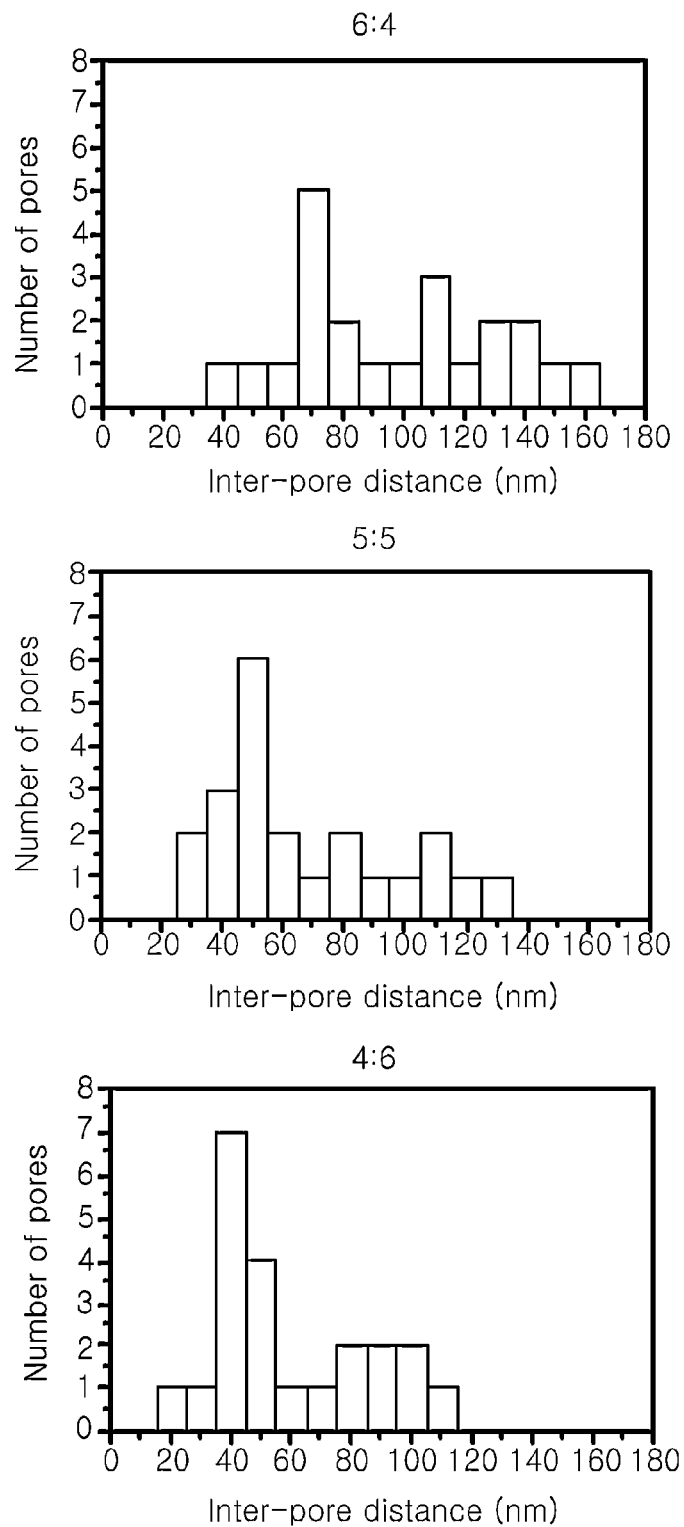
FIG. 3 shows a distribution of the inter-pore distance of graphene nanomeshes prepared in Example 1 according to an exemplary embodiment of the present disclosure with varying mixing ratios of a polymer mixture.

The surface of thus prepared graphene and carbon nanomeshes was observed under an atomic force microscope (AFM) and the result is shown in FIG. 2. Based on the result, inter-pore distance and average number of pores were determined (FIG. 3).

As the proportion of the pore-forming polymer was higher, the pore size was larger and the inter-pore distance was smaller in the prepared graphene and carbon nanomeshes.

Accordingly, it was confirmed that the pore size and inter-pore distance of the graphene and carbon nanomeshes are greatly dependent on the mixing ratio of the polymer mixture.

Figure 4:
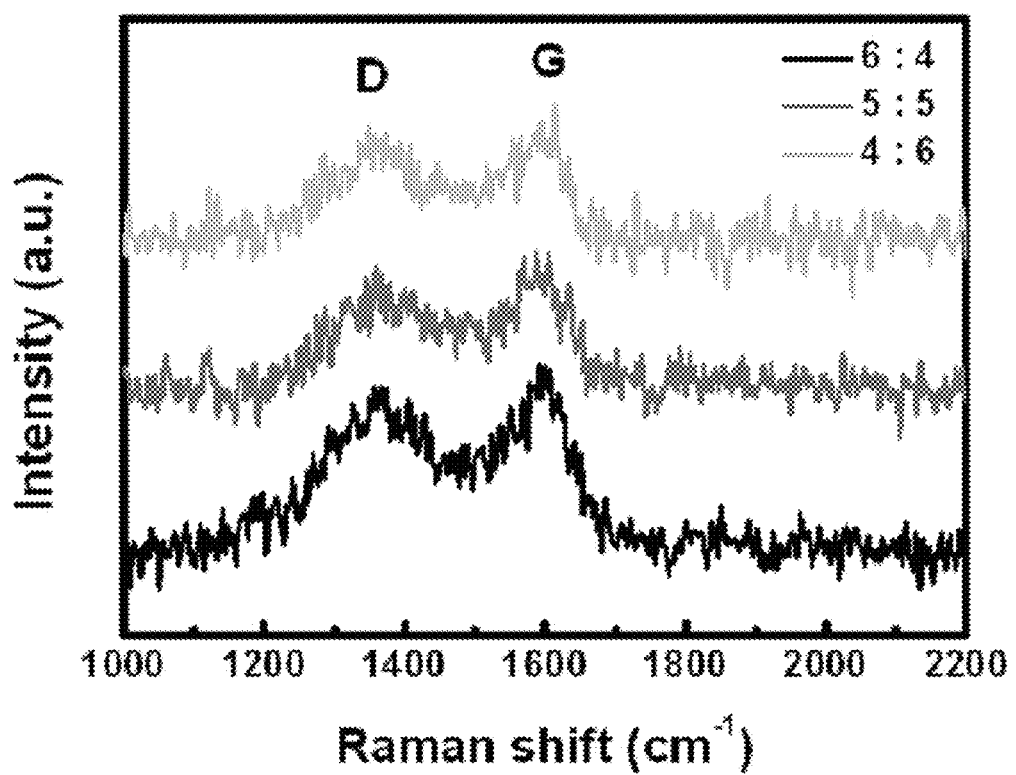
FIG. 4 shows Raman spectra of graphene nanomeshes prepared in Example 1 according to an exemplary embodiment of the present disclosure with varying mixing ratios of a polymer mixture.
Figure 5:
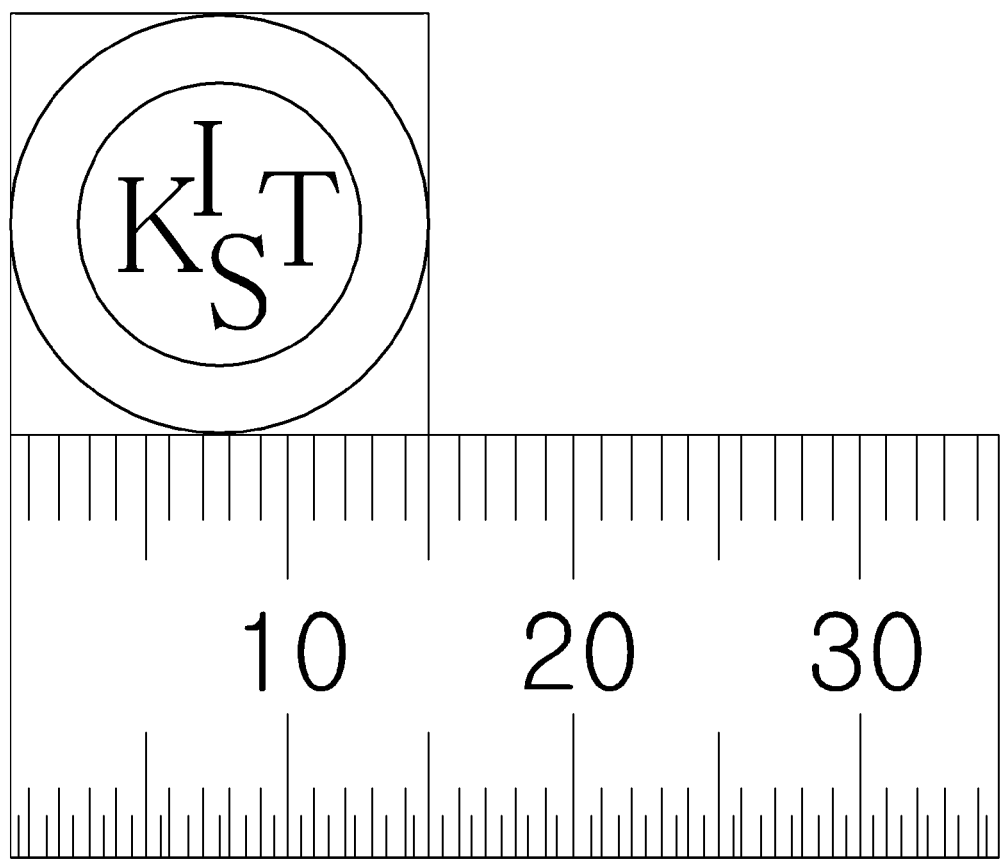
FIG. 5 shows an image of a graphene nanomesh prepared in Example 1 according to an exemplary embodiment of the present disclosure with a polymer mixture mixing ratio of 4:6.

Crystallinity of the graphene and carbon nanomeshes was investigated by Raman spectroscopy analysis and the result is shown in FIG. 4. FIG. 5 shows an image of the prepared graphene nanomesh. It can be seen that the nanomesh film is transparent. Accordingly, it is expected that the film can be used for a transparent electronic device.

Example 2

Figure 6:
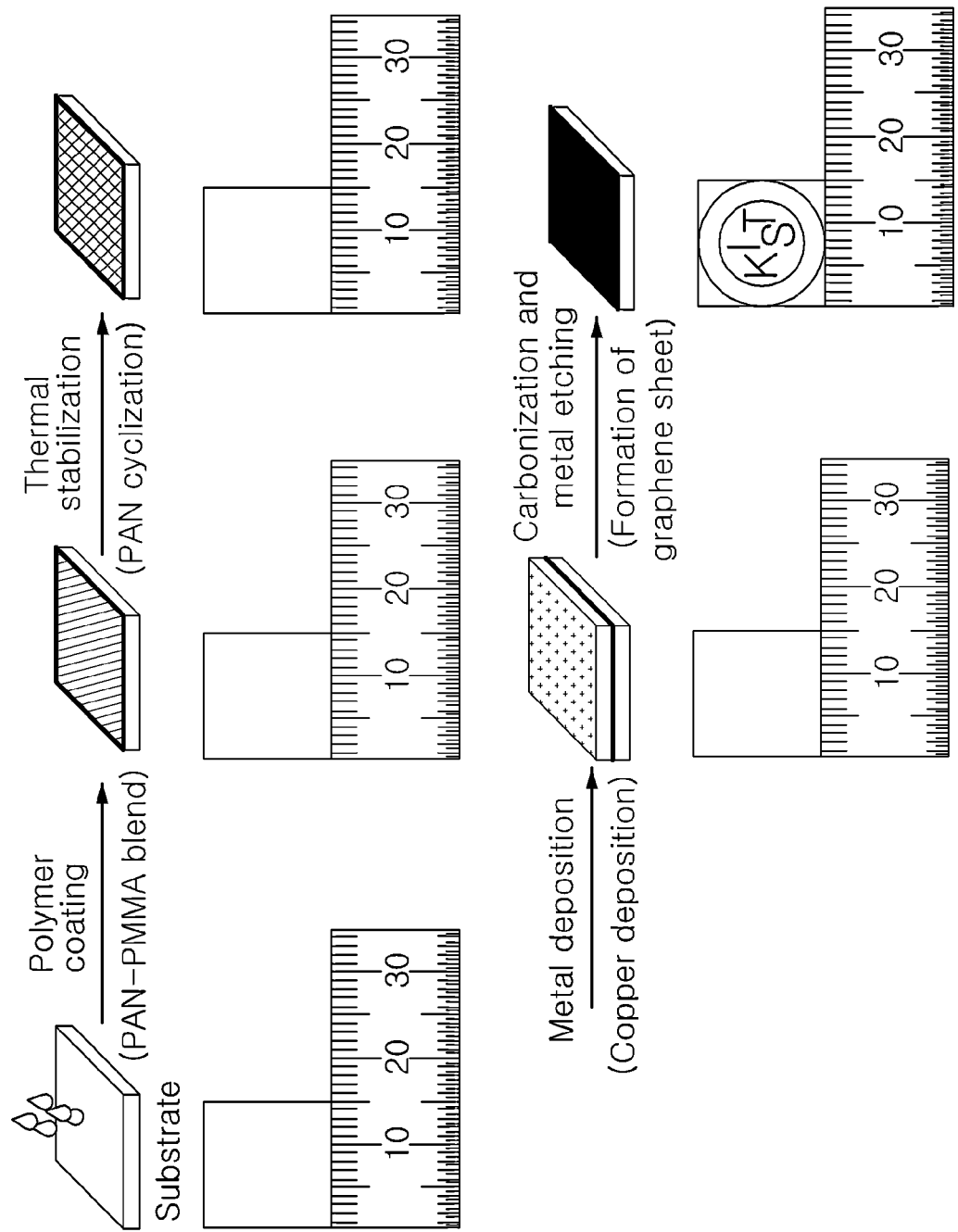
FIG. 6 shows a preparation process of Example 2 according to an exemplary embodiment of the present disclosure and images obtained at different steps.

Graphene and carbon nanomeshes were prepared in the same procedure as Example 1, except that a 100-nm thick metal film was deposited on the polymer film to induce formation into a polymer nanomesh and increase crystallinity. FIG. 6 shows the preparation process and images obtained at different steps.

Figure 7:
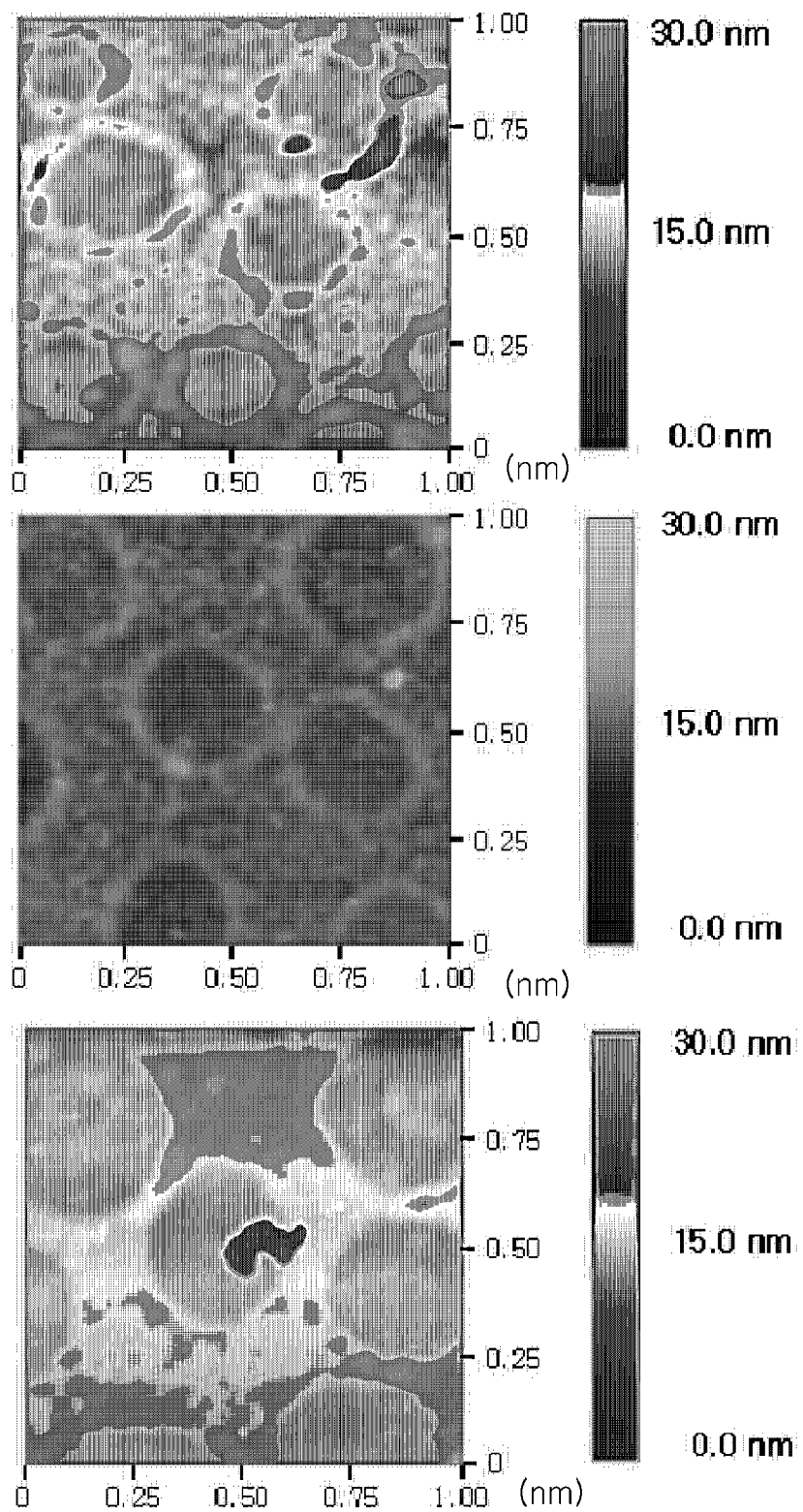
FIG. 7 shows surface images of graphene nanomeshes prepared in Example 2 according to an exemplary embodiment of the present disclosure.

The surface of thus prepared graphene and carbon nanomeshes was observed as in Example 1 and the result is shown in FIG. 7.

The graphene and carbon nanomeshes on which the metal film was deposited exhibited increased pore size and decreased inter-pore distance for the same mixing ratio. Through the metal film deposition, the inter-pore distance could be reduced to 10 nm or smaller.

Example 3

Figure 8:
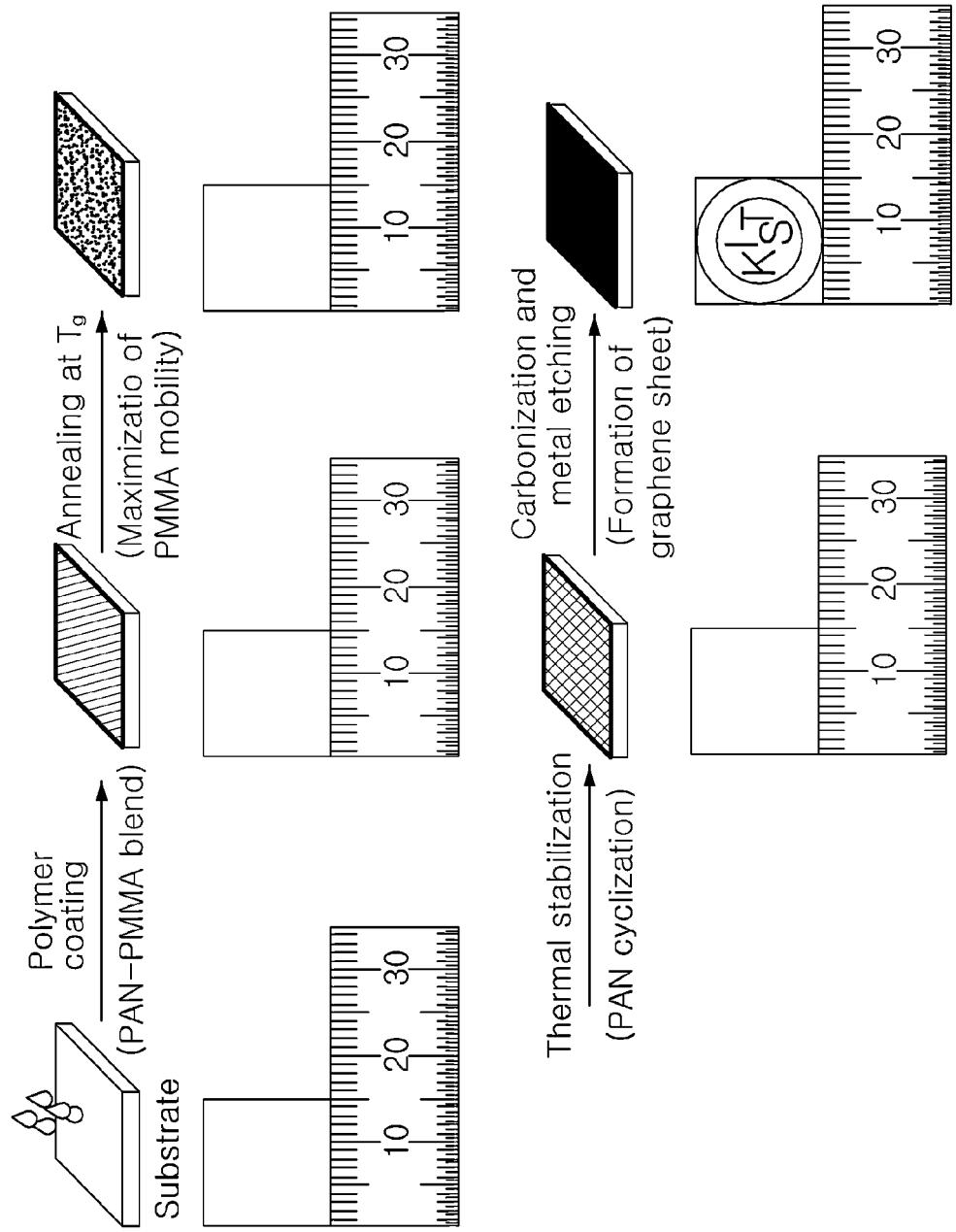
FIG. 8 shows a preparation process of Example 3 according to an exemplary embodiment of the present disclosure and images obtained at different steps.
Figure 9:
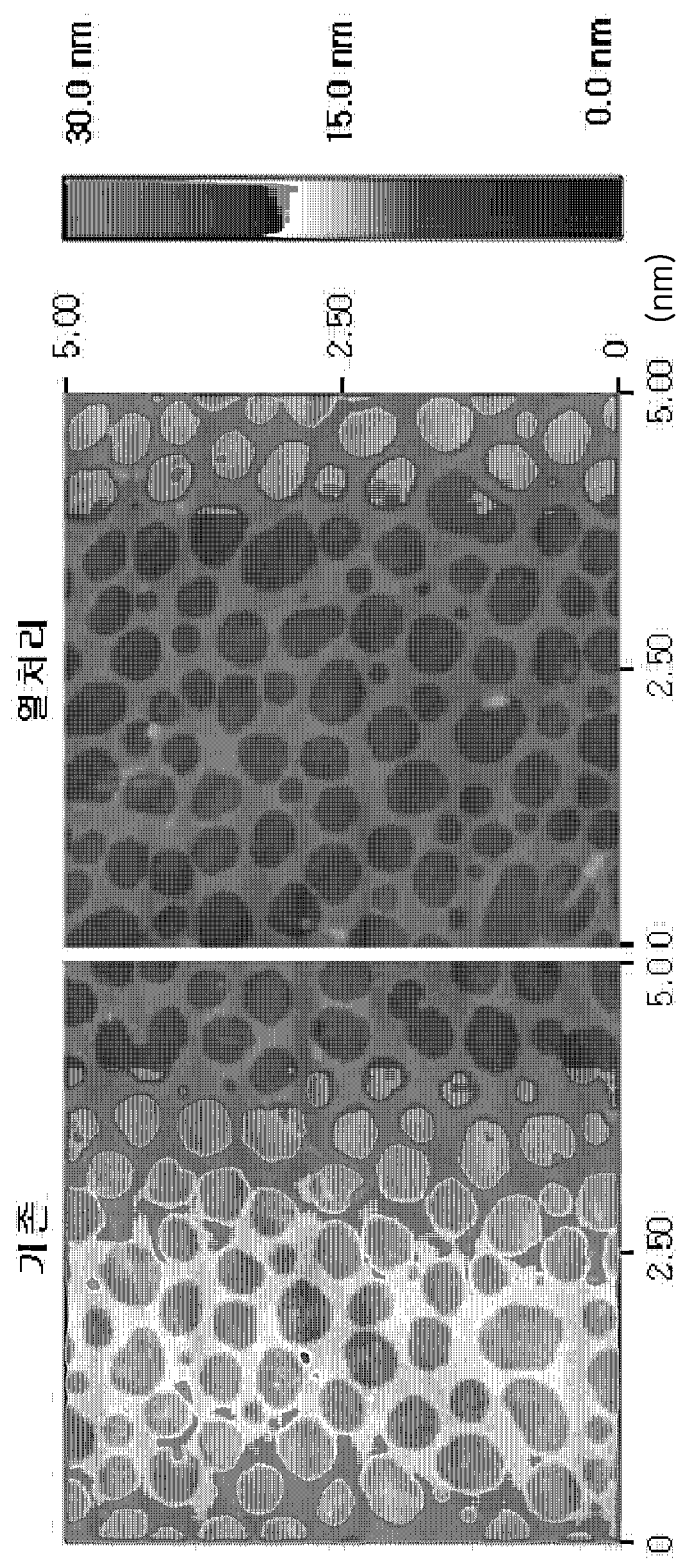
FIG. 9 shows surface images of graphene nanomeshes prepared in Example 3 according to an exemplary embodiment of the present disclosure with additional annealing.

Graphene and carbon nanomeshes were prepared in the same procedure as Example 1, except that annealing was further performed at a glass transition temperature of the pore-forming polymer before the thermal stabilization. FIG. 8 shows the preparation process and images obtained at different steps. The annealing was performed at 105° C. for 24 hours under an air atmosphere. The surface of thus prepared graphene and carbon nanomeshes was observed as in Example 1 and the result is shown in FIG. 9. It can be seen that the graphene and carbon nanomeshes further annealed at the glass transition temperature of the pore-forming polymer has a structure similar to that of the graphene and carbon nanomeshes without the annealing.

While the exemplary embodiments have been shown and described, it will be understood by those skilled in the art that various changes in form and details may be made thereto without departing from the spirit and scope of the present disclosure as defined by the appended claims. In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A method for preparing a carbon nanomesh, comprising:
preparing a polymer nanofilm by coating a solution of a block copolymer of a pore-forming polymer and a nanomesh-forming polymer or by coating a solution of a polymer mixture of a pore-forming polymer and a nanomesh-forming polymer, on a substrate,
stabilizing the polymer nanofilm such that the pore-forming polymer is removed and the nanomesh-forming polymer is cyclized and forms a stabilized polymer nanomesh with pores; and
carbonizing the stabilized polymer nanomesh with pores to prepare a carbon nanomesh.

2. The method for preparing a carbon nanomesh according to claim 1, which further comprises, before or after said stabilizing, depositing a metal nanofilm on the polymer nanofilm.

3. The method for preparing a carbon nanomesh according to claim 1, which further comprises, in said carbonizing, graphitizing the carbon nanomesh at 1800-3000° C. under an atmosphere of inert gas, hydrogen gas, vacuum or a combination thereof.

4. The method for preparing a carbon nanomesh according to claim 1, wherein the polymer mixture comprises the pore-forming polymer and the anomeshforming polymer with a mixing ratio of 0.01-100 and a pore size and an inter-pore distance of the carbon nanomesh are controlled by controlling the mixing ratio.

5. The method for preparing a carbon nanomesh according to claim 1, wherein the pore-forming polymer has a molecular weight of 100-10,000,000.

6. The method for preparing a carbon nanomesh according to claim 1, wherein the nanomesh-forming polymer has a molecular weight of molecular weight 100-10,000,000.

7. The method for preparing a carbon nanomesh according to claim 1, wherein the substrate comprises one or more transition metal selected from a group consisting of platinum (Pt), ruthenium (Ru), copper (Cu), iron (Fe), nickel (Ni), cobalt (Co), lead (Pd), tungsten (W), iridium (Ir), rhodium (Rh), strontium (Sr), cesium (Ce), praseodymium (Pr), neodymium (Nd), samarium (Sm) and rhenium (Re) or an alloy thereof or comprises one or more non-transition metal selected from a group consisting of magnesium (Mg), boron (B) and aluminum (Al) or an alloy thereof.

8. The method for preparing a carbon nanomesh according to claim 1, wherein, in said preparing the polymer nanofilm, the coating is performed by one or more coating method selected from a group consisting of spin coating, dip coating, bar coating, self-assembly, spraying, inkjet printing, gravure printing, gravure offset printing, flexography and screen printing.

9. The method for preparing a carbon nanomesh according to claim 1, wherein, in said stabilizing, the polymer nanofilm is formed into the nanomesh by annealing the polymer nano-film at 400° C. or lower under an atmosphere of air, oxygen or vacuum.

10. The method for preparing a carbon nanomesh according to claim 1, wherein in said stabilizing, the polymer nano-film is formed into the nanomesh by providing the polymer nano-film with a strongly alkaline aqueous solution, a strongly alkaline organic solution or a solvent with which only the pore-forming polymer reacts.

11. The method for preparing a carbon nanomesh according to claim 1, wherein, in said stabilizing, the polymer nano-film is formed into the nanomesh by applying plasma, ion beam, radioactive ray, ultraviolet light or microwave.

12. The method for preparing a carbon nanomesh according to claim 1, wherein a metal of the deposited metal nano-film comprises one or more transition metal selected from a group consisting of platinum (Pt), ruthenium (Ru), copper (Cu), iron (Fe), nickel (Ni), cobalt (Co), lead (Pd), tungsten (W), iridium (Ir), rhodium (Rh), strontium (Sr), cesium (Ce), praseodymium (Pr), neodymium (Nd), samarium (Sm) and rhenium (Re) or an alloy thereof or comprises one or more non-transition metal selected from a group consisting of magnesium (Mg), boron (B) and aluminum (Al) or an alloy thereof.

13. The method for preparing a carbon nanomesh according to claim 12, wherein the metal nanofilm is deposited on the polymer nanofilm by thermal deposition, physical vapor deposition or chemical vapor deposition.

14. A method for preparing a carbon nanomesh, comprising:
preparing a polymer nanofilm by coating a solution of a block copolymer of a pore-forming polymer and a nanomesh-forming polymer or by coating a solution of a polymer mixture of a pore-forming polymer and a nanomesh-forming polymer on a substrate;
stabilizing the polymer nanofilm by annealing such that a pore-forming polymer is removed and a nanomesh-forming polymer is cyclized and forms a stabilized polymer nanomesh with pores; and
carbonizing the stabilized polymer nanomesh with pores by annealing to prepare a carbon nanomesh,
wherein, before or after said stabilizing, depositing a metal nanofilm on the polymer nanofilm,
wherein the metal nanofilm is deposited on the polymer nanofilm by coating one or more metal precursor material selected from a group consisting of a metal chloride comprising $CuCl_2$, $CoCl_2$, $OsCl_3$, $CrCl_3$, $(NH_3)_6RuCl_3$, $FeCl_3$, $NiCl_2$, $PdCl_2$, $RuCl_3$ and $H_2PtCl_6$, a metal nitride comprising $Pd(NO_3)_2$, $(NH_3)_4Pt(NO_3)_2$, $Fe(NO_3)_3$ and $Ni(NO_3)_2$, iron acetlyacetonate, ferrocene and $Pt(acac)_2$ and then annealing.

15. The method for preparing a carbon nanomesh according to claim 1, wherein said carbonizing comprises carbonizing the stabilized polymer nanomesh at 400-1800° C. under an atmosphere of inert gas, hydrogen gas, vacuum or a combination thereof.

16. The method for preparing a carbon nanomesh according to claim 1, wherein said carbonizing is performed in the presence of a doping gas and the doping gas comprises a group 3-7 element.

17. A method for preparing a carbon nanomesh, comprising:
preparing a polymer nanofilm by coating a solution of a block copolymer of a pore-forming polymer and a nanomesh-forming polymer or by coating a solution of a polymer mixture of a pore-forming polymer and a nanomesh-forming polymer on a substrate;
stabilizing the polymer nanofilm by annealing such that a pore-forming polymer is removed and a nanomesh-forming polymer is cyclized and forms a stabilized polymer nanomesh with pores; and
carbonizing the stabilized polymer nanomesh with pores by annealing to prepare a carbon nanomesh,
wherein, in said carbonizing, volatile carbon molecules are injected and the volatile carbon molecules are acetylene, ethylene or methane.

18. The method for preparing a carbon nanomesh according to claim 1, wherein the prepared carbon nanomesh has a length of 1 nm to 1 m in horizontal and vertical directions, respectively.

19. The method for preparing a carbon nanomesh according to claim 1, wherein the prepared carbon nanomesh has an inter-pore distance of 1 nm to 1 μm.

20. The method for preparing a carbon nanomesh according to claim 1, which further comprises inducing aggregation of like polymers before or after or during said stabilizing.

\* \* \* \* \*